(12) United States Patent
Post et al.

(10) Patent No.: US 8,478,796 B2
(45) Date of Patent: Jul. 2, 2013

(54) UNCORRECTABLE ERROR HANDLING SCHEMES FOR NON-VOLATILE MEMORIES

(75) Inventors: Daniel J. Post, Campbell, CA (US); Vadim Khmelnitsky, Foster City, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 12/729,544

(22) Filed: Mar. 23, 2010

(65) Prior Publication Data

US 2011/0238629 A1 Sep. 29, 2011

(51) Int. Cl.
*G06F 12/00* (2006.01)
*G06F 17/30* (2006.01)

(52) U.S. Cl.
USPC .................................................. 707/813

(58) Field of Classification Search
USPC .......................................... 707/687, 813
See application file for complete search history.

(56) References Cited

U.S. PATENT DOCUMENTS

| | | | |
|---|---|---|---|
| 7,533,330 B2 * | 5/2009 | Anderson et al. | 714/799 |
| 2008/0250270 A1 * | 10/2008 | Bennett | 714/6 |
| 2009/0172262 A1 * | 7/2009 | Olbrich et al. | 711/103 |

* cited by examiner

*Primary Examiner* — James Trujillo
*Assistant Examiner* — Jeffrey Chang
(74) *Attorney, Agent, or Firm* — Van Court & Aldridge LLP

(57) ABSTRACT

Systems and methods are provided for handling uncorrectable errors in a non-volatile memory ("NVM"), such as flash memory, during a garbage collection operation.

19 Claims, 9 Drawing Sheets

US 8,478,796 B2

UNCORRECTABLE ERROR HANDLING SCHEMES FOR NON-VOLATILE MEMORIES

FIELD OF THE INVENTION

This can relate to systems and methods for handling uncorrectable errors in non-volatile memory.

BACKGROUND OF THE DISCLOSURE

NAND flash memory, as well as other types of non-volatile memories ("NVMs"), are commonly used in electronic devices for mass storage. For example, consumer electronics such as portable media players often include flash memory to store music, videos, and other media.

Non-volatile memories, however, may develop defective memory cells through everyday use, and operational memory cells may suffer from program/erase/read disturb due to voltages applied to neighboring cells. When a memory location, such as a page, of a NVM contains too many defective cells or otherwise becomes unusable from excessive errors, the information contained within that memory location may be lost. When this occurs, the electronic device using the NVM might lose user data (e.g., data stored by an application). In addition, the electronic device might lose metadata that the electronic device uses to manage the NVM. When the user data or metadata of particular memory location is affected to such an extent that it cannot be corrected using an error correction code, that memory location has experienced an uncorrectable error.

In some operations such as garbage collection, the occurrence of an uncorrectable error (e.g., an unreadable memory location) can have substantial adverse effect on the management of the NVM.

SUMMARY OF THE DISCLOSURE

Accordingly, systems and methods are disclosed for handling uncorrectable errors in a non-volatile memory that occur during a garbage collection operation. During a garbage collection operation, data from pages of one block are read and written to new pages in another block. An uncorrectable error can occur, for example, if the logical address or other metadata pertaining to a page cannot be read or accessed. When a page experiences an uncorrectable error, the system may retrieve the metadata (e.g., logical address) associated with the page experiencing the error and use the retrieved metadata to recover from the error. Recovery from the error can enable the system to continue the garbage collection operation and maintain data coherency.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
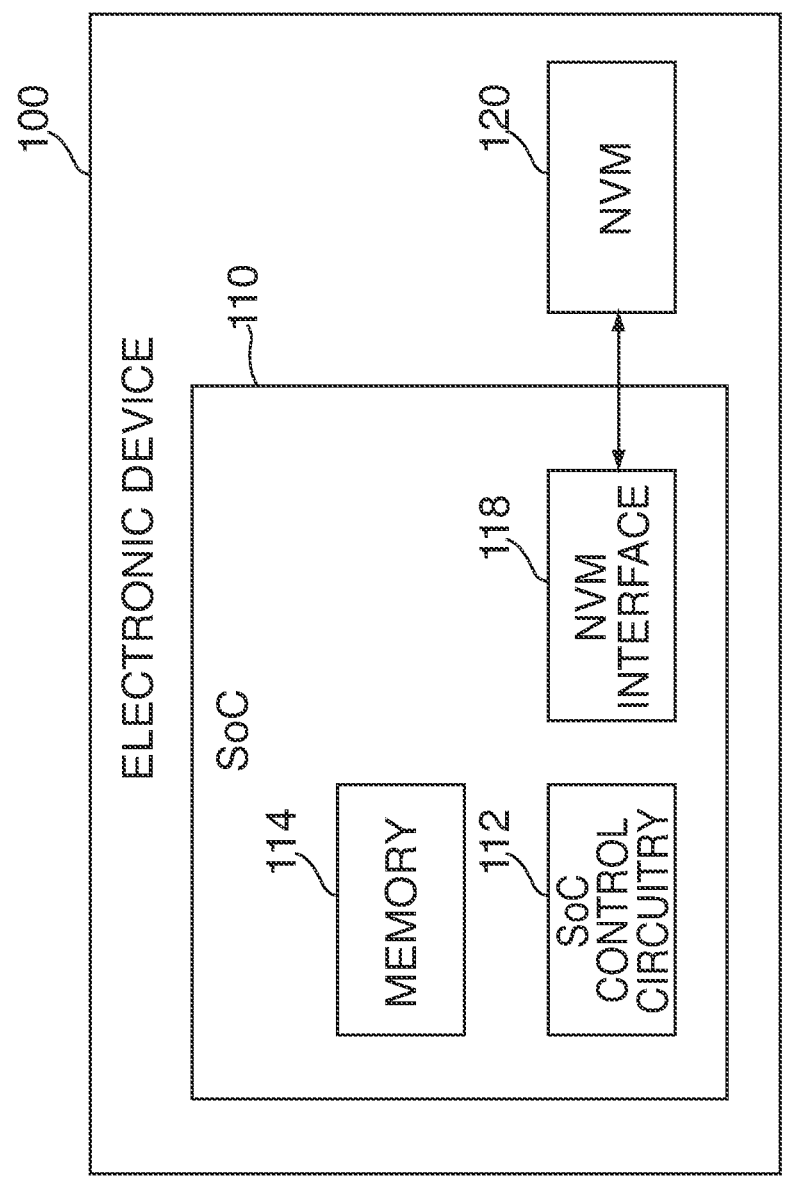
FIGS. 1 and 2 are schematic views of electronic devices configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof. NVM 120 can be organized into "blocks" that may each be erasable at once, and further organized into "pages" that may each be programmable and readable at once. In some embodiments, NVM 120 can include multiple integrated circuits, where each integrated circuit may have multiple blocks. The blocks from corresponding integrated circuits (e.g., blocks having the same position or block number) may form "super blocks." Each memory location (e.g., page or block) of NVM 120 can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, a processor implemented as part of SoC control circuitry 112 may execute a software-based memory driver for NVM interface 118. Accordingly, portions of SoC control circuitry 112 and NVM interface 118 may sometimes be referred to collectively as "control circuitry."

FIG. 1 illustrates an electronic device where NVM 120 may not have its own controller. In other embodiments, electronic device 100 can include a target device, such as a flash or SD card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
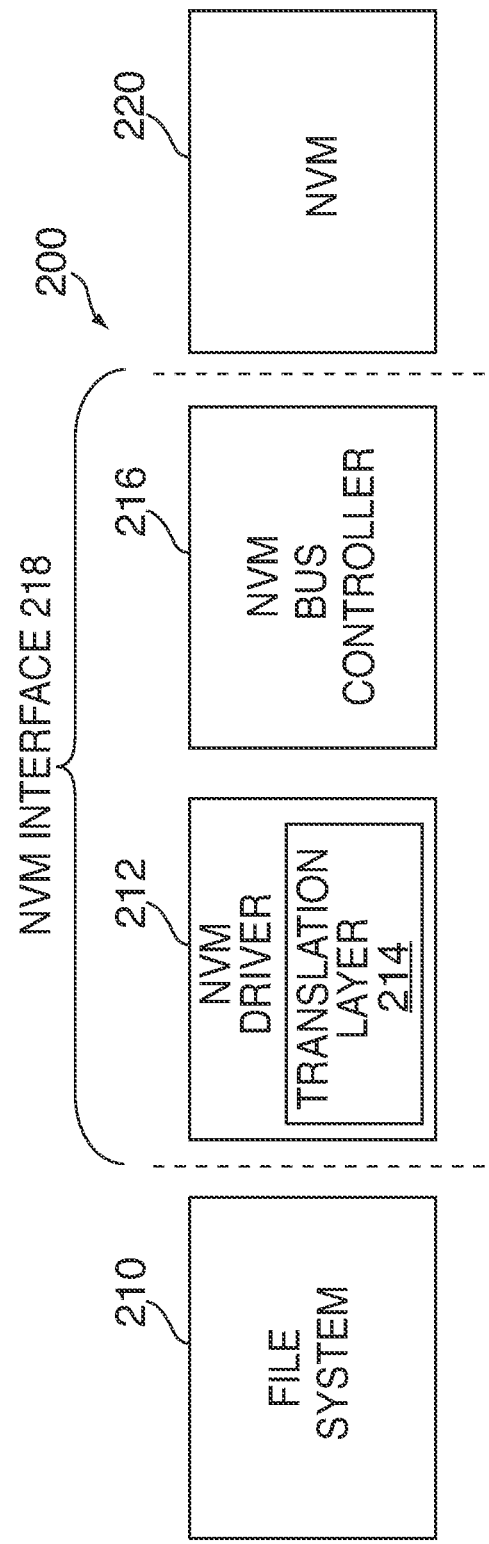

FIG. 2 is a schematic view of electronic device 200, which may illustrate in greater detail some of the firmware, software and/or hardware components of electronic device 100 (FIG. 1) in accordance with various embodiments. Electronic device 200 may have any of the features and functionalities described above in connection with FIG. 1, and vice versa. Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system and may be part of the operating system of electronic device 200 (e.g., part of SoC control circuitry 112 of FIG. 1). In some embodiments, file system 210 may include a flash file system, which provides a logical to physical mapping of pages. File system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write operation, translation layer 214 can map the provided logical address to a free, erased physical location on NVM 220. On a read operation, translation layer 214 can use the provided logical address to determine the physical address at which the requested data is stored. Because each NVM may have a different layout depending on the size or vendor of the NVM, this mapping operation may be memory and/or vendor specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata." The metadata may be generated by NVM driver 212 or may be generated by a module operating under the control of NVM driver 212. For example, metadata can include any information used for managing the mapping between logical and physical addresses, bad block management, wear leveling, error correcting code ("ECC") data, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location. For example, the metadata may contain a flag that indicates whether the stored data is good data.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association.

However, a memory location of NVM 220 may become unreadable due to disturb effects from neighboring locations, defects, failed read operations, or due to some other error-causing phenomena. When this occurs, NVM interface 218 may not only lose the actual user data at that memory location, but NVM interface 218 may no longer be able to determine what kind of information was supposed to be stored at that memory location (e.g., may no longer be able to determine the logical address associated with the user data). In other words, NVM interface 218 may lose any information about the user data or any information that NVM interface 218 needs to manage the user data stored at that memory location. If NVM interface 218 is unable to manage the memory location having an uncorrectable error, it may implement an uncorrectable error handling scheme according to embodiments of the invention before initiating a time-consuming physical-to-logical translation. Before discussing error handling schemes, illustrative memory mapping architectures are first discussed in FIGS. 3 and 4 to provide framework in which the schemes may operate.

Figure 3A:
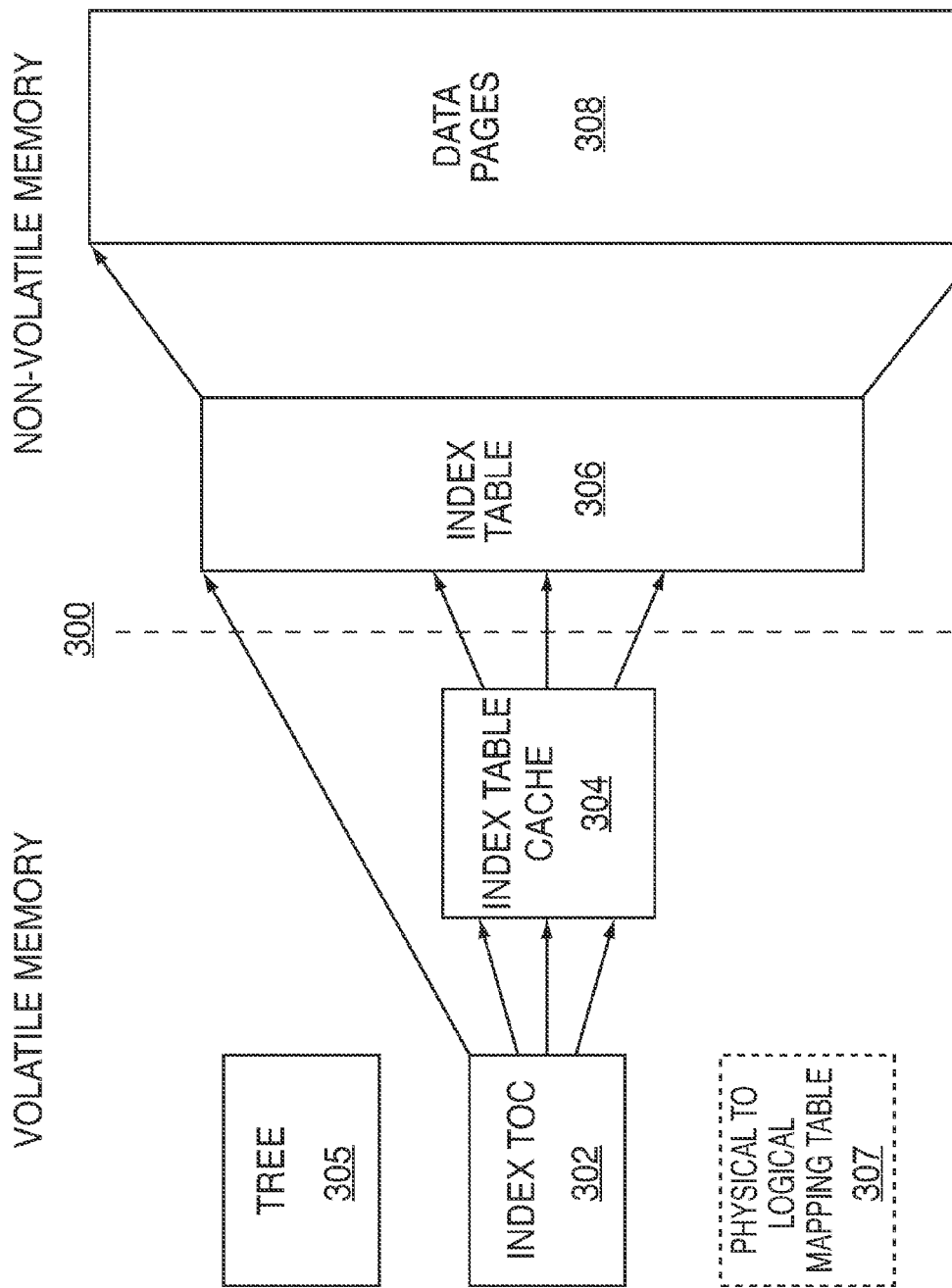
FIGS. 3A, 3B and 4 are illustrative block diagrams of memory mapping architecture, in accordance with various embodiments of the invention.

Referring now to FIG. 3A, a block diagram illustrating an example memory mapping architecture 300 for mapping logical sectors into physical pages using lookup tables is shown. Architecture 300 is divided into volatile memory (shown left of the dashed line) and non-volatile memory (shown right of the dashed line). Lookup table 302 and index cache 304 are stored in volatile memory, whereas index table 306 and data pages 308 are stored in non-volatile memory. Index table 306 maps a logical address to each page of pages 308, thereby storing a logical-to-physical page mapping. Thus, index table 306 holds the physical addresses of data pages 308. Index table 306 is stored in pages of the non-volatile memory.

Lookup table 302 can hold the location (e.g., physical page addresses) of index table 306. Thus, lookup table 302 holds the logical to physical mapping of the index pages that form part of index table 306. Cache 304 can hold the physical addresses of recently written or accessed logical addresses. Thus, cache 304 can hold logical to physical mapping of pages 308 currently being written or recently written. Cache 304 can be a redundant mapping that is also stored in index table 306.

Lookup table 302, cache 304, both table 302 and cache 304, or other data structure in volatile memory can include tree 305. Tree can hold a compressed form of the physical addresses of the most recently accessed or written pages, including pages in index table 306 and data pages 308. In accordance with embodiments of this invention, tree 305 may provide logical addresses for pages experiencing uncorrectable errors. When a page is experiencing an uncorrectable error, and its logical address can be determined by accessing the tree.

Tree 305 uses a tree structure (e.g., a b-tree, a b*-tree, etc.) to decrease the retrieval time for entries within, for example, cache 304. By using a data structure that enables efficient searching (e.g., binary search, etc.) of entries contained in volatile memory (e.g., cache 304), increased speed can be gained when determining whether a desired logical to physical address mapping is contained within the volatile memory. The more quickly a determination as to whether a logical to physical address mapping is contained within the volatile memory, the sooner a flash memory device employing the architecture 300 can use the mapping to initiate retrieval of the identified physical memory. This is advantageous since a flash memory device may consult the volatile memory (e.g., cache 304) frequently (e.g., during read operations) when attempting to resolve a logical to physical address mapping.

Tree 305 can also use data compression to increase its capacity to store logical to physical address mappings. This is advantageous because tree 305 may be allotted a relatively small quantity of volatile memory. Thus by using data compression, older physical addresses can be stored longer before they need to be flushed to make room for newer physical addresses.

Figure 3B:
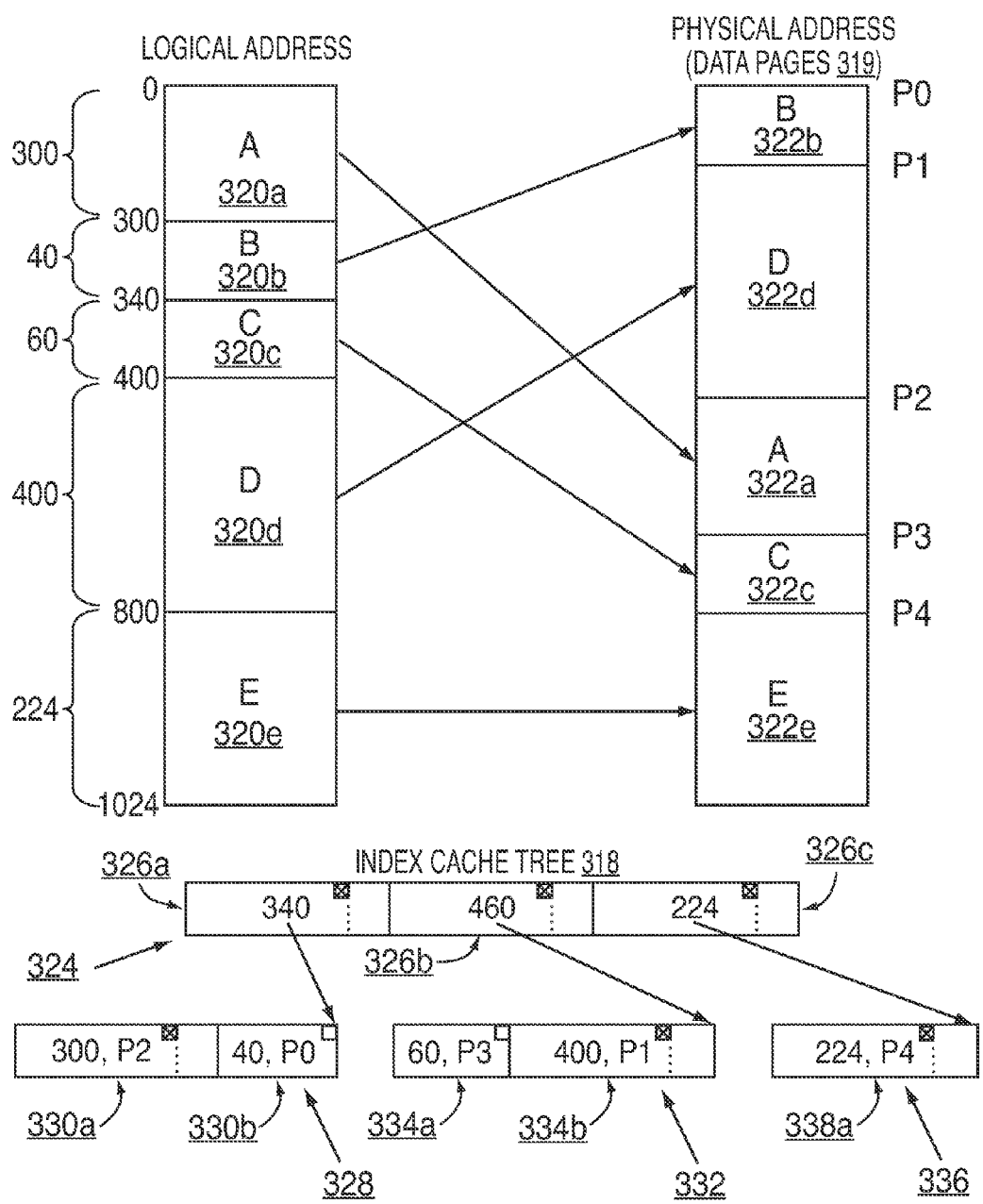

FIG. 3B is a block diagram illustrating an example mapping of logical sectors directly into physical data pages 319 using an example tree 318. Tree 318 is similar to tree 305 and the data pages 319 are similar to data pages 308, as described above with regard to FIG. 3A. In this example, tree 318 has a tree structure that uses two levels of data compression. The first level of data compression corresponds to run-length encoding and the second level of data compression corresponds to a flag designating a size for each entry in the tree. The entry size can correspond to a number of bits allocated to the run-length encoding span. As a run-length encoding span increases in size, a number of bits allocated to the run-length encoding span can increase. For example, a span of 100 logical addresses can be allocated a smaller number of run-length encoding bits than a span of 100,000 logical addresses. A flag can indicate which of a fixed number of predetermined sizes correspond to each entry. For example, if a device generally stores small files (e.g., text files, configuration files, etc.) and large files (e.g., audio files, video files, etc.), the flag can indicate which of two fixed sizes (e.g., 4-bits and 6-bits) are used for run-length encoding each entry. Any number of predetermined entry sizes (e.g., two sizes, four sizes, eight sizes, ten sizes, etc.) can be used within the tree and indicated by the flag. In some implementations, variable-sized entries for storing a physical address and/or pointer fields can be used.

In this example, the data files A-E 320a-e are illustrated as corresponding to logical addresses. For example, data file B 320b is depicted as corresponding to address 300. The size of each of the data files, A-E 320a-e, is shown by the numbered spans to the left of the data files A-E 320a-e. For instance, the data file D 320d has a logical address span of 400.

The data files A-E 320a-e correspond to physical locations in the data pages 319, as depicted by physical data files A-E 322a-e. Each of these physical data files A-E 322a-e has a corresponding physical address P0-P4. For example, the physical data file A 322a has the physical address P2.

Tree 318 maps the logical addresses to the physical addresses using tree of nodes 324, 328, 332, and 336. Each of the nodes 324, 328, 332, and 336 contains at least one of the entries 326a-c, 330a-b, 334a-b, and 338a. The entries are populated with logical address spans for each of the data files A-E 320a-e and either a pointer to another node or a physical address for a corresponding physical data file A-E 322a-e. For instance, the entry 330a corresponding to data file A 320a contains the logical address span 300 and the physical address P2 of the physical data file A 322a.

Nodes 324, 328, 332, and 336 and the entries 326a-c, 330a-b, 334a-b, and 338a are organized according to a logical address offset for each entry. A logical address offset can be the difference between the logical address of an entry and the first logical address. In the present example, the logical address offset is the same as the logical address itself because the first logical address is zero. However, were the first logical address to be 100 (e.g., logical address for file A 320a is 100), then the logical offset would be the logical address minus 100 (e.g., for file B 320b the logical offset would be 200 (300−100=200)).

In the present example, the nodes 324, 328, 332, and 336 and the entries 326a-c, 330a-b, 334a-b, and 338a are arranged left-to-right from the smallest logical address offset to the greatest logical address offset. For instance, since the entry 330a corresponds to data file A 320a (having logical address 0) and the entry 330b corresponds to the data file B 320b (having logical address 300), the entry 330a is arranged to the left of the entry 330b.

Entries that contain a pointer to another node (e.g., entries 326a-c) can store an aggregate logical address span for the entries contained within the pointed to node (and the pointed to nodes children). For instance, the entry 326a has a logical address span of 340, which is the aggregate value of the logical address spans for 330a-b (300+40=340).

The logical address offset for a data file (e.g., data files A-E 320a-e) can be used to locate the physical address for the data file. To identify the entry in the index cache tree 318 that contains the corresponding physical address, the logical address spans stored in the entries 326a-c, 330a-b, 334a-b, and 338a are aggregated as the nodes 324, 328, 332, and 336 are traversed. As the entries of index cache tree 318 are individually examined, the aggregated value (e.g., a tally) serves as the logical address offset for the entry that is currently being evaluated. The tally is initialized at zero and traversal of tree 318 can begin with the first entry 326a (e.g., the entry with the smallest logical address offset) of the root node 324. If the logical address offset at issue (e.g., logical address for which a physical address is sought) is greater than or equal to the tally plus the logical address span of the entry being evaluated, then the logical address span of the entry is added to the tally and the next entry in the node is evaluated.

If the logical address offset is less than the tally plus the logical address span of the entry being evaluated, then the entry being evaluated corresponds to the logical address offset at issue. In such a case, if the entry being evaluated stores a pointer to another node, then evaluation shifts to the first entry of the pointed to node. If the entry being evaluated stores a physical address, then evaluation can end because the corresponding physical address has been located.

For instance, if the physical address for the data file D 320d is sought, the following steps would be taken:

Step 1: Receive logical address offset for data file D 320d (logical address offset=400) and initialize tally=0

Step 2: Is logical address span of entry 326a (340)+tally (0)<=logical address offset (400)? Yes, add logical address span of entry 126a to tally (340=0+340)

Step 3: Is logical address span of entry 326b (460)+tally (340)<=logical address offset (400)? No, follow pointer of entry 326b to node 332

Step 4: Is logical address span of entry 334a (60)+tally (340)<=logical address offset (400)? Yes, add logical address span of entry 334a to tally (400=340+60)

Step 5: Is logical address span of entry 334b (400)+tally (400)<=logical address offset (400)? No, retrieve physical address (P1) stored in entry 334b—corresponding physical address located By storing the logical address span instead of the logical address itself, each entry in tree 318 is compressed. The logical address span will generally be a fraction of the size of the logical address, allowing fewer bits to be allocated. As such, tree 318 can store a greater number of entries than a flat logical-to-physical mapping, which can in-turn improve the speed by which memory accesses are processed and create greater efficiency within a flash memory device.

Additional details regarding tree 318 and other examples thereof and methods of using such trees can be found in co-pending, commonly assigned U.S. patent application Ser. No. 12/509,287, filed Jul. 24, 2009, the disclosure of which is incorporated herein in its entirety.

In some implementations, each entry of the index TOC 302 stores a physical address in non-volatile memory of an index table 306 entry and a pointer to an entry in cache 304. The address 0xff or other suitable indicator can be placed in a index TOC 302 entry to indicate that a desired index table 106 entry is not stored in the cache 304.

In some implementations, index table 306 can include a flat file structure that provides the logical address to physical address mappings. In other implementations, index table 306 can include an index tree that provides compression of data entries, similar to the index cache trees 310 or 318.

In some embodiments, the volatile memory may store a physical-to-logical mapping in optional separate table 307. The physical-to-logical mapping may be the reverse of the logical-to-physical mapping. If desired, in some embodiments, the physical-to-logical mapping may be maintained in non-volatile memory. In one embodiment, table 307 may contain a flat physical-to-logical mapping. In another embodiment, table 307 may contain a compressed tree of the physical-to-logical mapping, similar to tree 305.

Figure 4:
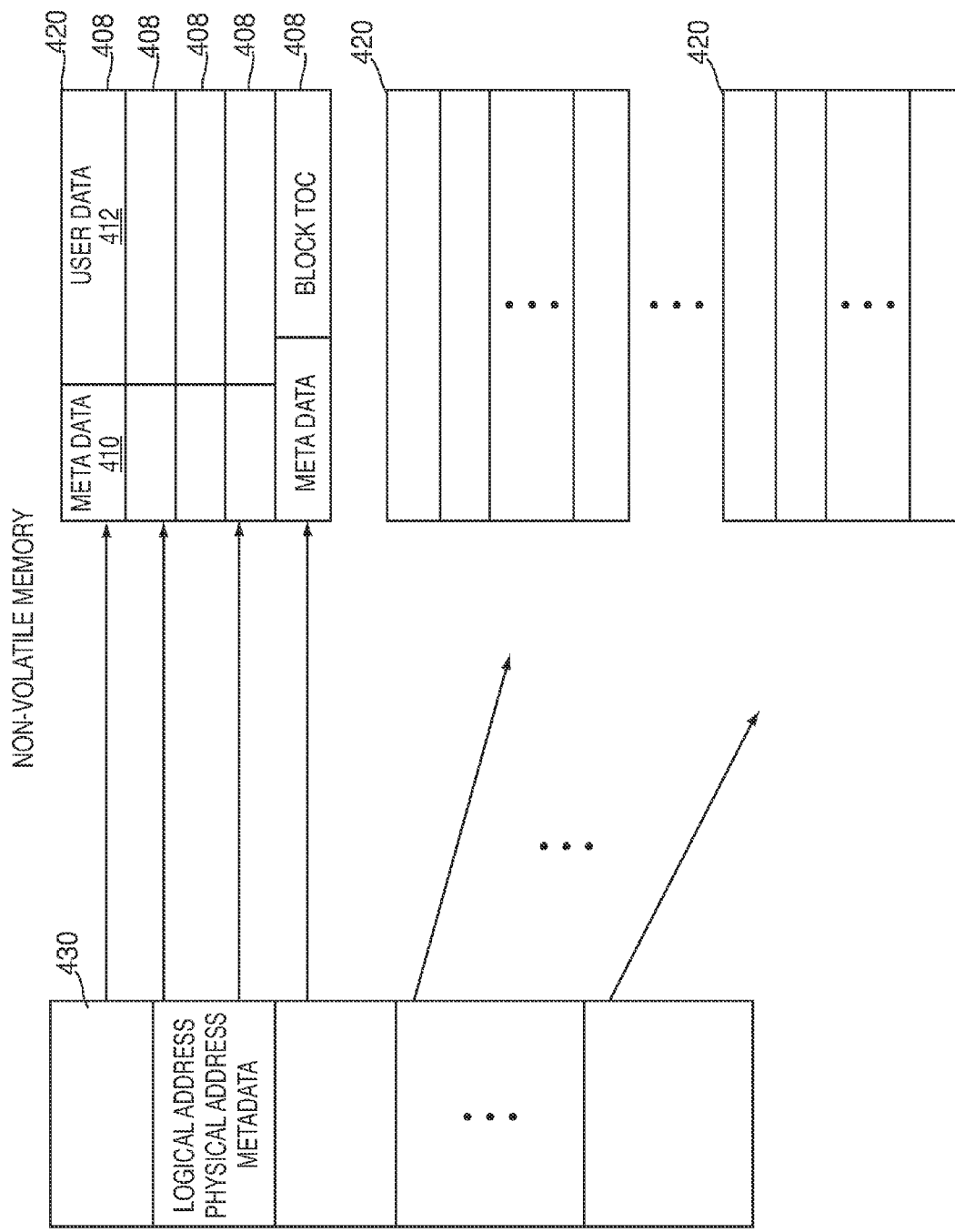

FIG. 4 shows illustrative memory architecture of non-volatile memory. Pages 408 are illustratively arranged in blocks 420. Some pages 408 may be used as data pages and can include metadata 410 and user data 412. Metadata 410 can include the logical address for that page. Some pages may be used for storing information on other pages for a block. For example, one page 408 can include a block table of contents that stores the logical address of each page in the block. The Block TOC may be stored, for example, in the last page within a block, and can also include metadata. This Block TOC typically exists in blocks that have been completely written. In some embodiments, an aggregation of blocks (across two or more dies or planes) may be virtually coalesced to form a superblock. The superblock may have its own Block TOC for storing logical addresses and other metadata for each page of that superblock.

It is understood that references to a Block TOC herein may be made with respect to a block (in the physical sense) or to a superblock (in the virtual sense).

Index table 430 may include several blocks (referred to as index blocks), which include several pages (referred to as index pages). Index table 430 may have an entry for each page 408. The entry may store the logical address, the physical address, and metadata associated with each page 408. The metadata may include a flag that may be set to indicate whether a page has experienced an uncorrectable error, but that the error is no longer present.

As defined herein, redundant metadata includes duplicated versions of the metadata stored in a page experiencing the uncorrectable error. For example, redundant metadata may be stored in a Block TOC, a data structure in volatile memory, or an index table (e.g., index table 306). In other embodiments, redundant data may be stored in a page neighboring the page having the error, the neighboring page being in the same block or an adjacent block as the page having the error. A more detailed explanation of accessing redundant metadata from a neighboring page can be found, for example, in Post et al., U.S. patent application Ser. No. 12/562,860, filed Sep. 18, 2009.

Garbage collection is an operation that moves valid pages from a first block to a second block so that the first block can be erased and made available for subsequent data storage. As data is moved from one block to another, the NVM interface keeps track of where the data is written by correlating the logical address to the physical address of a page. As discussed above, this mapping may be maintained in the index table (e.g., index table 306) and/or in the volatile memory (e.g., cache 304 tree 305, or table 307). During normal operation of garbage collection, in which there are no uncorrectable errors, the correlation of the logical address to the physical address is seamlessly and quickly performed because the logical address of the page is known. However, when an uncorrectable error occurs and metadata (e.g., logical address) associated with the page cannot be read, various steps according to embodiments of the invention may be taken to ascertain the metadata of that page so the garbage collection operation can continue.

Figure 5A:
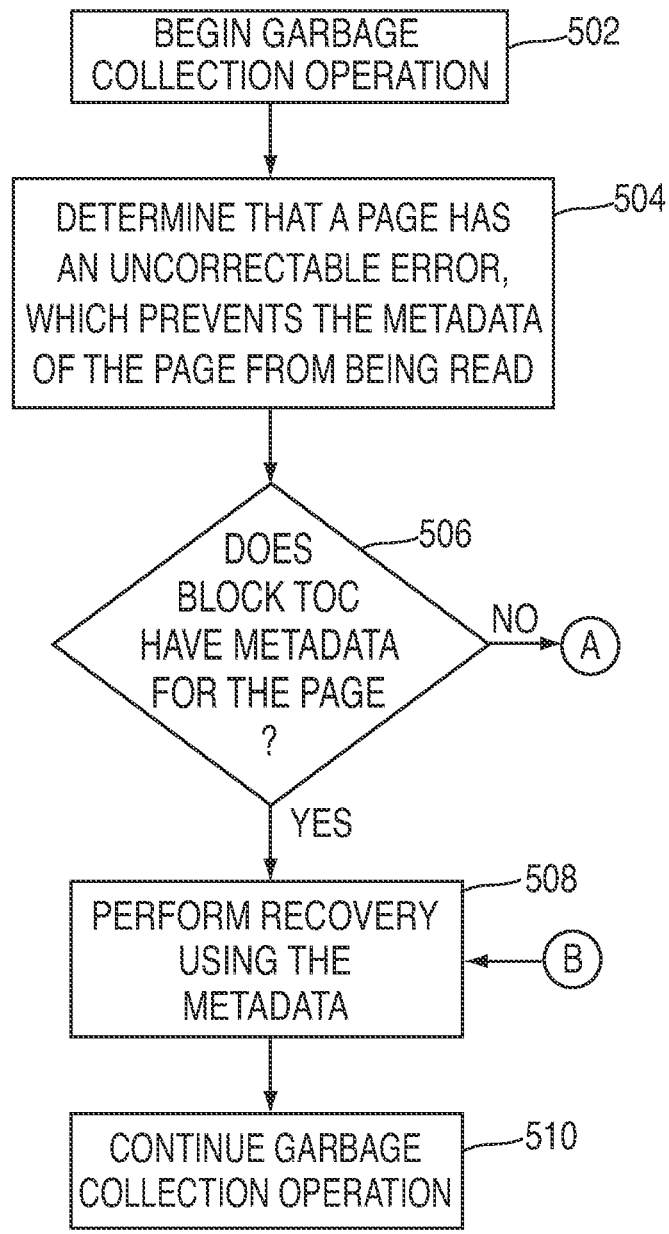
FIGS. 5A & 5B is a flowchart of an illustrative process for handling uncorrectable errors in accordance with various embodiments of the invention.

FIG. 5 is an illustrative flow chart of steps that may be taken to handle an uncorrectable error during a garbage collection operation according to an embodiment of the invention. Beginning at step 502, a garbage collection operation may begin. At step 504, it is determined that a page has an uncorrectable error, which prevents the metadata of the page from being read. In one embodiment, because the metadata cannot be accessed, the NVM interface may not know the logical address of the page. For the purposes of this example, assume that a determination has been made as to which pages in a given block are valid and that only those valid pages will be read so that they can be programmed into another block.

At step 506, a determination is made as to whether a Block TOC associated with the page contains metadata (e.g., the logical address) for that page. In one embodiment, the Block TOC being accessed may reside in one or more pages of the block containing the page experiencing the uncorrectable error (e.g., such as the Block TOC in block 420 of FIG. 4). In another embodiment, the Block TOC being accessed may reside in volatile memory. For example, such a Block TOC may exist in volatile memory for a block being written or recently written to NVM. If the Block TOC contains the metadata for the page, the process proceeds to step 508.

At step 508, recovery of the uncorrectable error is performed using the metadata. There are several different approaches for performing the recovery step, but each results in maintaining data coherency and enables the NVM interface to continue with the garbage collection operation. Recovery is not to be confused with recovery of user data, but rather, it refers to recovery from an uncorrectable error and registers the fact that the data used to exist, but is no longer available. In one embodiment, the data of the page experiencing the error can be written to another page, and a flag in the metadata of that page may be set to indicate that the data associated with the page is not valid. In another embodiment, the index table and/or data structure can be updated to indicate that the page had an uncorrectable error, but is no longer present. Additional details on the various recovery embodiments are discussed below in connection with FIGS. 7 and 8. After the error has been recovered, the NVM interface can continue with the garbage collection operation, as indicated by step 510.

Figure 5B:
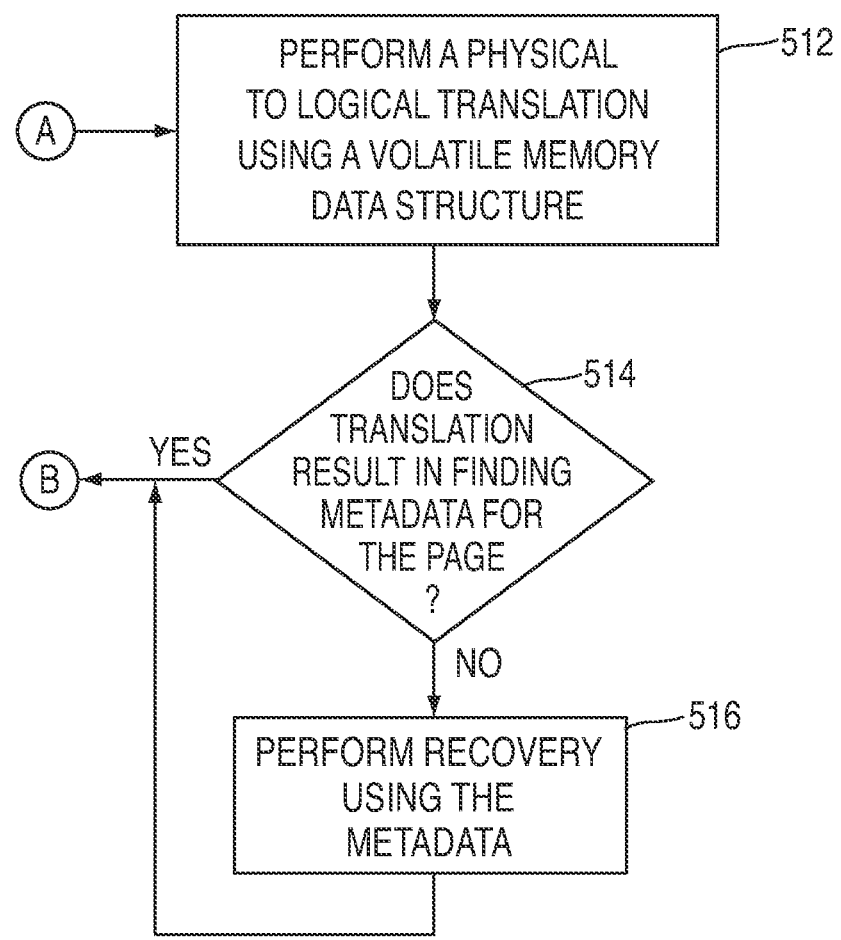

If, at step 508, metadata is not available in the Block TOC (e.g., because the Block TOC has also experienced an uncorrectable error), then the NVM may perform a physical-to-logical translation using a volatile memory data structure or tree, as indicated by step 512 (in FIG. 5B). As discussed above, the data structure or tree can contain the logical-to-physical mappings stored in volatile memory. In one embodiment, the physical-to-logical translation may be performed by exhaustively searching the tree (the logical-to-physical mapping contained in the tree) to find a page that exists at the location of the page having the uncorrectable error. Searching a logical-to-physical mapping to ascertain a logical address for a given a physical address is contrary to the purpose for which the logical-to-physical mapping is provided. Conventionally, the logical address is known, but in this case it is not. Therefore, in order to locate the logical address for a given page, they system may traverse through tree using all known logical addresses until it locates the page that matches the page having the error. If the page is found in the tree, then logical address is found and the metadata can be retrieved.

In another embodiment, the physical-to-logical translation may be performed by accessing a physical-to-logical mapping (e.g., physical-to-logical mapping table 307) to obtain the logical address of the page. If the physical address is found in the tree, then the corresponding metadata may be available. Accessing a physical-to-logical mapping may result in a more direct retrieval of the metadata than by accessing a logical-to-physical mapping, but maintaining a physical-to-logical mapping may require greater use of limited memory resources.

If (at step 514) the translation results in finding the metadata for the page, then the process proceeds to step 508. If the tree does not have the metadata, then the process proceeds to step 516.

At step 516, an index page scan is performed to locate the metadata for the page. The index page scan involves scanning the index pages stored in NVM (e.g., index pages 430 of FIG. 4) for an entry pointing to the physical address of the page. When the entry pointing to the physical page is found, the metadata can be retrieved and the process proceeds to step 508.

An advantage that can be realized by accessing the Block TOC before accessing the tree or by scanning the index pages is increased throughput of the garbage collection operation. Thus, if the Block TOC contains the metadata required for recovery, the requisite data is readily available for enabling the garbage collection operation to continue without having to resort to steps 512 or 516.

Persons skilled in the art will appreciate that additional steps may be added or omitted as desired, and that the order of the steps may be rearranged.

Figure 6:
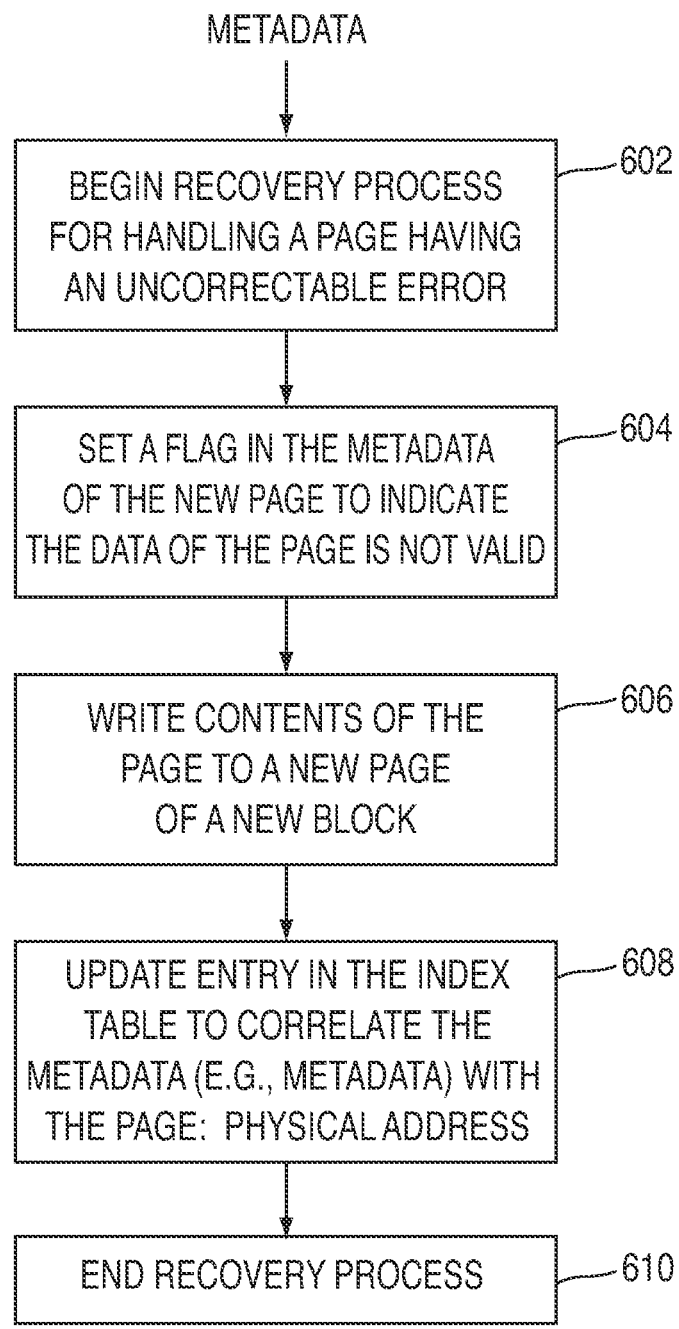
FIG. 6 is a flowchart of an illustrative process for performing a recovery step in accordance with various embodiments of the invention.

FIG. 6 is an illustrative flow chart of a process for recovering from an uncorrectable error, according to an embodiment of the invention. The entirety of recovery process 600 may be an embodiment executed in step 508 of FIG. 5. The recovery process for handling a page having an uncorrectable error begins at step 602. Assume that the metadata (e.g., logical address) has been retrieved from one of the possible sources of such data (e.g., Block TOC, tree, or index page scan) at the start of the recovery process. At step 604, a flag in the metadata of the new page is set to indicate that the data of the page is not valid. The user data portion of the flag may be invalid, but the metadata portion is valid. This flag can serve as a marker to the NVM interface that the contents of this page are invalid. Thus, with a page marked as such, the NVM interface can process it accordingly whenever it is later accessed.

At step 606, the contents (e.g., user data portion) of the page are written to a new page in a new block. The new block can be part of a new superblock, for example. When the page is written, the metadata retrieved from step 506, 512, or 516 may be written into the new page's metadata. For example, the recovered logical address may be written into the metadata of the new page. Then, at step 608, an entry in the index table (e.g., index table 430) is updated to correlate the metadata (e.g., logical address) with the new page's physical address. If desired, the data structure in volatile memory may also be updated. At step 610, the recovery step ends.

Figure 7:
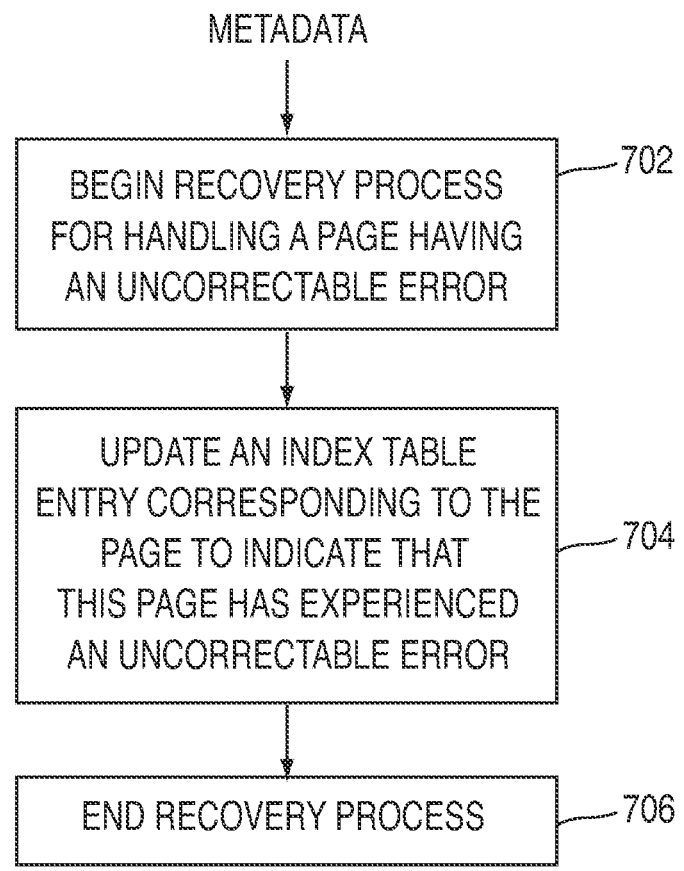
FIG. 7 is a flowchart of another illustrative process for performing a recovery step in accordance with various embodiments of the invention.

FIG. 7 is another illustrative flow chart of a process for recovering from an uncorrectable error, according to an embodiment of the invention. The entirety of recovery process 700 may be an embodiment executed in step 508 of FIG. 5. The recovery process for handling a page having an uncorrectable error begins at step 702. Assume that the metadata (e.g., logical address) has been retrieved from one of the possible sources of such data (e.g., Block TOC, tree, or index page scan) at the start of recovery process 700.

At step 704, an index table entry for the page is updated to indicate that the page experienced an uncorrectable error, but that the error is no longer present. The index table entry may be updated as follows. Using the retrieved metadata data, and in particular, the logical address contained therein, the NVM interface can identify which entry in the index table corresponds to that page. When the entry is identified, a flag may be set to indicate that the page had an uncorrectable error. If desired, a data structure in memory can also be updated to indicate that the page experienced an error. Thus, whenever the NVM interface accesses the data in the index page entry corresponding to that page, it is aware that the page had an error and can process it accordingly. This promotes data coherency and inform the file system that the data associated with this particular logical address is no longer valid. At step 706, the recovery step ends.

The described embodiments of the invention are presented for the purpose of illustration and not of limitation, and the invention is only limited by the claims which follow.

What is claimed is:

1. A method for handling an uncorrectable error during a garbage collection operation, the method comprising:
   determining that a page has an uncorrectable error during a garbage collection operation, wherein metadata associated with the page is not accessible;
   accessing a block table of contents (Block TOC) to determine if redundant metadata associated with the page is available, wherein the redundant metadata comprises a logical address of the page; and
   if the Block TOC has the redundant metadata, performing a recovery operation using the redundant metadata, wherein the performing the recovery operation comprises continuing to perform the garbage collection operation while informing a file system that data associated with the logical address is invalid.

2. The method of claim 1, wherein the Block TOC is maintained in at least one page of a superblock in non-volatile memory that contains the page having the uncorrectable error, the Block TOC including metadata for pages in the superblock.

3. The method of claim 1, wherein the Block TOC is maintained in volatile memory for a superblock while that superblock is being written in to non-volatile memory.

4. The method of claim 1, further comprising:
   if the Block TOC does not have the metadata, using a volatile memory data structure to locate redundant metadata for the page; and
   if the volatile data structure has the redundant metadata, using the redundant metadata from the data structure to perform the recovery operation.

5. The method of claim 4, wherein the volatile data structure maintains a physical-to-logical mapping, and wherein the using comprises accessing the physical-to-logical mapping to obtain the redundant metadata.

6. The method of claim 4, wherein the volatile data structure maintains a logical-to-physical mapping, and wherein the using comprises searching the logical-to-physical mapping to obtain the redundant metadata.

7. The method of claim 4, further comprising:
   if the volatile data structure does not have the redundant metadata, performing an index page scan to locate redundant metadata for the page and using the redundant metadata to perform the recovery operation.

8. The method of claim 1, wherein performing the recovery operation further comprises:
   writing content of the page to a new page in a new block;
   setting a flag in metadata of the new page to indicate that data of the new page is not valid; and
   updating an index table entry to correlate the logical address to the new page.

9. The method of claim 1, wherein performing the recovery operation comprises:
   updating an index table entry corresponding to the logical address to indicate that the page has experienced an uncorrectable error.

10. A method for performing garbage collection in a non-volatile memory, the non-volatile memory comprising a plurality of pages, wherein index pages store an index table that maintains a logical-to-physical mapping of non-index pages, and wherein the non-index pages are arranged in blocks, each block having a block table of contents (Block TOC) that stores the logical address of each page in that block, the method comprising:
    initiating a garbage collection operation on a first block;
    determining that a first page in the first block has an uncorrectable error and its logical address is unknown;
    accessing a Block TOC to obtain the logical address of the first page; and
    if the Block TOC has the logical address,
       writing contents of the first page to a second page in a second block;
       setting a flag in metadata of the second page to indicate that data of the second page is invalid; and
       updating the index table to correlate the logical address to the second page.

11. The method of claim 10, further comprising:
    accessing a data structure contained in volatile memory to perform a physical-to-logical translation to obtain the logical address of the page; and
    if the data structure has the logical address, using the logical address from the data structure to:
       write contents of the first page to a second page in a second block;
       set a flag in metadata of the second page to indicate that data of the second page is invalid; and
       update the index table to correlate the logical address to the second page.

12. The method of claim 11, wherein the data structure is a tree of a logical-to-physical mapping.

13. The method of claim 11, wherein the data structure includes a physical-to-logical mapping.

14. The method of claim 11, further comprising:
    if the data structure does not have the logical address, performing a scan of the index pages to locate the logical address of the first page;
    using the logical address located in the scan to:

write contents of the first page to a second page in a second block;

set a flag in metadata of the second page to indicate that data of the second page is invalid; and update the index table to correlate the logical address to the second page.

15. A memory interface for accessing a non-volatile memory, the non-volatile memory comprising a plurality of pages, wherein index pages store an index table that maintains a logical-to-physical mapping of non-index pages, and wherein the non-index pages are arranged in blocks, each block having a block table of contents (Block TOC) that stores the logical address of each page in that block, the memory interface comprising:

a bus controller for communicating with the non-volatile memory; and control circuitry operative to direct the bus controller to perform a garbage collection operation on a first block, the control circuitry further operative to:

determine that a first page in the first block has an uncorrectable error and its logical address is unknown;

access a Block TOC to obtain the logical address of the first page; and if the Block TOC has the logical address, updating an index table entry in the index table corresponding to the logical address to indicate that the first page has experienced an uncorrectable error, wherein the updating the index table entry informs a file system that data associated with the logical address is invalid.

16. The memory interface of claim 15, wherein the control circuitry is operative to:

perform a physical-to-logical translation of a data structure contained in volatile memory to obtain the logical address of the first page if the Block TOC does not have the logical address; and if the data structure has the logical address, update an index table entry in the index table corresponding to the logical address to indicate that the first page has experienced an uncorrectable error.

17. The memory interface of claim 16, wherein the data structure is operative to temporarily store a redundant version of the logical-to-physical mapping stored in the index table.

18. The memory interface of claim 16, wherein the data structure includes a tree of a logical-to-physical mapping.

19. The memory interface of claim 15, wherein the control circuitry is operative to:

scan the index pages to locate the logical address if the data structure did not have the logical address; and use the logical address retrieved from the index pages to update an index table entry in the index table corresponding to the logical address to indicate that the first page has experienced an uncorrectable error.

* * * * *

UNITED STATES PATENT AND TRADEMARK OFFICE
CERTIFICATE OF CORRECTION

| | |
|---|---|
| PATENT NO. | : 8,478,796 B2 |
| APPLICATION NO. | : 12/729544 |
| DATED | : July 2, 2013 |
| INVENTOR(S) | : Daniel J. Post et al. |

Page 1 of 1

It is certified that error appears in the above-identified patent and that said Letters Patent is hereby corrected as shown below:

In the Drawings

In Figure 5B, Sheet 7 of 9, for Tag "516", Lines 1-3, delete "PERFORM RECOVERY USING THE METADATA" and insert -- PERFORM INDEX PAGE SCAN --, therefor.

In the Claims

In Column 11, Line 60, in Claim 3, delete "written in to" and insert -- written into --, therefor.

Signed and Sealed this
Thirtieth Day of September, 2014

Michelle K. Lee
*Deputy Director of the United States Patent and Trademark Office*